(12) United States Patent
Numano (10) Patent No.: US 7,154,453 B2
(45) Date of Patent: Dec. 26, 2006

(54) INFORMATION PROCESSING APPARATUS WITH POINTER INDICATOR FUNCTION

(75) Inventor: Fujihito Numano, Minato-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 440 days.

(21) Appl. No.: 10/434,854

(22) Filed: May 9, 2003

(65) Prior Publication Data

US 2004/0004604 A1 Jan. 8, 2004

(30) Foreign Application Priority Data

May 31, 2002 (JP) .............................. 2002-159988

(51) Int. Cl.
*G09G 5/00* (2006.01)
*G09G 5/08* (2006.01)
(52) U.S. Cl. ...................... 345/1.1; 345/156; 345/157; 345/158
(58) Field of Classification Search ................. 345/1.1
See application file for complete search history.

(56) References Cited

U.S. PATENT DOCUMENTS

| 6,392,676 | B1 | | 5/2002 | Mori et al. | |
| 6,429,846 | B1 | * | 8/2002 | Rosenberg et al. | 345/156 |
| 6,670,950 | B1 | * | 12/2003 | Chin et al. | 345/173 |
| 6,934,778 | B1 | * | 8/2005 | Numano | 710/67 |
| 2005/0024341 | A1 | * | 2/2005 | Gillespie et al. | 345/173 |

FOREIGN PATENT DOCUMENTS

| JP | 7-13676 | 1/1995 |
| JP | 7-146754 | 6/1995 |
| JP | 8-36479 | 2/1996 |
| JP | 8-44493 | 2/1996 |
| JP | 11-65759 | 3/1999 |
| JP | 2000-339097 | 8/2000 |
| JP | 2000-259316 | 9/2000 |
| JP | 2001-285445 | 10/2001 |

OTHER PUBLICATIONS

Society for Information Display, "Information Display Online", http://www.sid.org/news/archive/newsstory0203.html, Mar. 2002, p. 1,2-3.*
University of Glasgow, "Microsoft WINDOWS 95", University of Glasgow Computing Service, http://www.uni.edu/its/us/documents/win95/glasgow.htm,Jan. 1997, p. 4-22.*

(Continued)

*Primary Examiner*—Sumati Lefkowitz
*Assistant Examiner*—Alexander S. Beck
(74) *Attorney, Agent, or Firm*—Foley & Lardner LLP (57) ABSTRACT

An information processing apparatus and method providing a main display for displaying a first operation screen used to perform a first operation and a sub-display separate from the main display for displaying a second operation screen used to perform a second operation. The sub-display is integral with a touch pad pointing device. A processor of the information processing apparatus is programmed to provide notification when the second operation screen is opened or changed. The notification may be selectively provided on the main display such that a user performing touch operation on the sub-display while viewing the main display is notified that the second operation screen has been opened or changed. The notification may be visual, audible or tactile. The second operation may be executed in parallel with the first operation or independently of the first operation. The first operation screen and the second operation screen may be simultaneously displayed.

1 Claim, 9 Drawing Sheets

OTHER PUBLICATIONS

Microsoft, "The Microsoft Windows Guidelines for Accessible Software Design", htt://web.cs.bgsu.edu/maner/uiguides/msaccess.htm, May 1997, p. 1-62.*

Microsoft, "Personalize Your Computer: Customize Your Mouse and Pointer", http://www.microsoft.com/windowsxp/using/setup/getstarted/mouse.mspx, Aug. 2001, p. 1,2.*

Contour, "Contour MiniPro USB Mouse README File—Windows 98/ME", http://we.archive.org/web/20011030165458/http://www.contourdesign.com/minipro_pc.htm, Dec. 2000, p. 1,2.*

Dunn, Scott. "Windows Tips: Take Charge of Windows Audio Controls", http://pcworld.com/howto/article/0,aid,68776,00.asp, Nov. 21, 2001. PCWorld.com, p. 2.*

* cited by examiner

INFORMATION PROCESSING APPARATUS WITH POINTER INDICATOR FUNCTION

CROSS-REFERENCE TO RELATED APPLICATIONS

This application is based upon and claims the benefit of priority from the prior Japanese Patent Application No. 2002-159988, filed May 31, 2002, the entire contents of which are incorporated herein by reference.

BACKGROUND OF THE INVENTION

1. Field of the Invention

The present invention relates generally to an information processing apparatus including a pointer indicator function, and more particularly to an information processing apparatus having a plurality of display screens for displaying operation screens and a method for providing notification when an operation screen is changed.

2. Description of the Related Art

In recent years, various portable personal computers of a notebook or laptop type have been developed. This type of portable personal computer includes various functions for enhancing operability.

One example of such a function is a pointing device for a portable computer. An example of this type of pointing device is a tablet device which includes a touch pad as described in Jpn. Pat. Appln. KOKAI Publication No. 8-44493 and which has been broadly used. When pointing operations such as a touch movement operation and tap operation are performed on this tablet device, various screen operations are possible such as controlling movement of a mouse pointer displayed on a display device and selection of a display button.

Moreover, in recent years, this type of portable personal computer includes various functions for enhancing the operability. One such function is a two-screen cooperation function of displaying a plurality of operation screens at the same time and reflecting the operation of one of the operation screens in another operation screen so that two-screen parallel operation is possible.

In the above-described prior-art document, a technique is described comprising: performing a touch operation in a position corresponding to an input field in a displayed application screen on a display screen to which a touch panel is attached to display a software keypad in one corner on the display screen. With this two-screen cooperation function, an input operation can be facilitated and accelerated.

Furthermore, the computer system described in the above-described prior-art document is constituted such that two screens to be operated in conjunction with each other are displayed on a single display (device). However, to further enhance operation, a system constitution has been realized in which one device includes two displays (devices). One display is used for main operation (main display), and the other display is used for sub-operation (sub-display).

However, there are problems which prevent the effective use of this two display system. One of the problems is that the user looks at the main display while performing a touch operation on the sub-display and the user is therefore apt to neglect visual screen operation confirmation of the sub-display.

As a result, when the operation screen of the sub-display changes as a result of an erroneous operation by the user on the operation screen of the sub-display without the user immediately being aware of it, problems may result. For example, an operation which has been performed may become invalid, or further erroneous operations may be performed before the first erroneous operation is detected.

In order for a user to avoid such negative results, the user must frequently visually check the display screen of the sub-display to ensure that such an erroneous operation has not occurred. However, for users skilled in "touch operation" (i.e., sightless or "blind" operation) of the sub-display, frequent visual checks of the sub-display may decrease the user's efficiency and may be annoying to the user, because such a user may prefer to instead focus on the main display screen substantially all through the operation.

Because such users skilled in touch operation do not frequently check the sub-display, however, a lot of time may pass before an erroneous operation is noticed by the user, possibly resulting in further erroneous operations. Furthermore, if a user has to constantly be switching his visual focus between the main display and the sub-display, the operability of the information processing apparatus may be impaired.

As described above, in the related art, in processing devices such as a portable computer, the main display and sub-display are provided, and an operable screen is displayed on each display. In this case, during the performing of the touch operation on the main display, the operator looks at the main display. Therefore, the operator is apt to neglect the screen operation confirmation of the sub-display, and there are problems that erroneous operation is caused and that operability is impaired.

SUMMARY OF THE DISCLOSURE

According to embodiments of the present invention, an information processing apparatus and method is disclosed. The apparatus and method provides a main display for displaying a first operation screen used to perform a first operation and a sub-display separate from the main display for displaying a second operation screen used to perform a second operation.

According to one embodiment, the sub-display is integral with a touch pad pointing device. A processor of the information processing apparatus is programmed to provide notification when the second operation screen is opened or changed.

According to further embodiments of the present invention, the notification may be selectively provided on the main display such that a user performing touch operation on the sub-display while viewing the main display is notified that the second operation screen has been opened or changed. The notification may be visual, audible or tactile.

According to still further embodiments of the present invention, the second operation may be executed in parallel with the first operation or independently of the first operation. The first operation screen and the second operation screen may be simultaneously displayed.

These and other features and advantages of embodiments of the invention will be apparent to those skilled in the art from the following detailed description of embodiments of the invention, when read with the drawings and appended claims.

DETAILED DESCRIPTION OF THE PREFERRED EMBODIMENTS

An embodiment of the present invention will be described hereinafter with reference to the drawings.

According to the present embodiment, a pointing device with an integral display is provided in an information processing device. In the information processing device, a display panel (sub-display) such as an LCD and a touch pad or tablet integral with the sub-display are provided separately from a display device (main display) in which a mouse pointer is displayed. The present embodiment is characterized in that various setting screens and operation screens are set and operated in this device.

One example of a display-equipped pointing device that is available is the cPad™ by Synaptics, Inc., 2381 Bering Dr., San Jose, Calif. 95131. (see http://www.synaptics.com/products/cPad.cfm). In the embodiment of the present invention, an example of a constitution will be described in which the cPad™ (hereinafter referred to as the cPad™ device) is used in the pointing device of the display united type.

Figure 1:
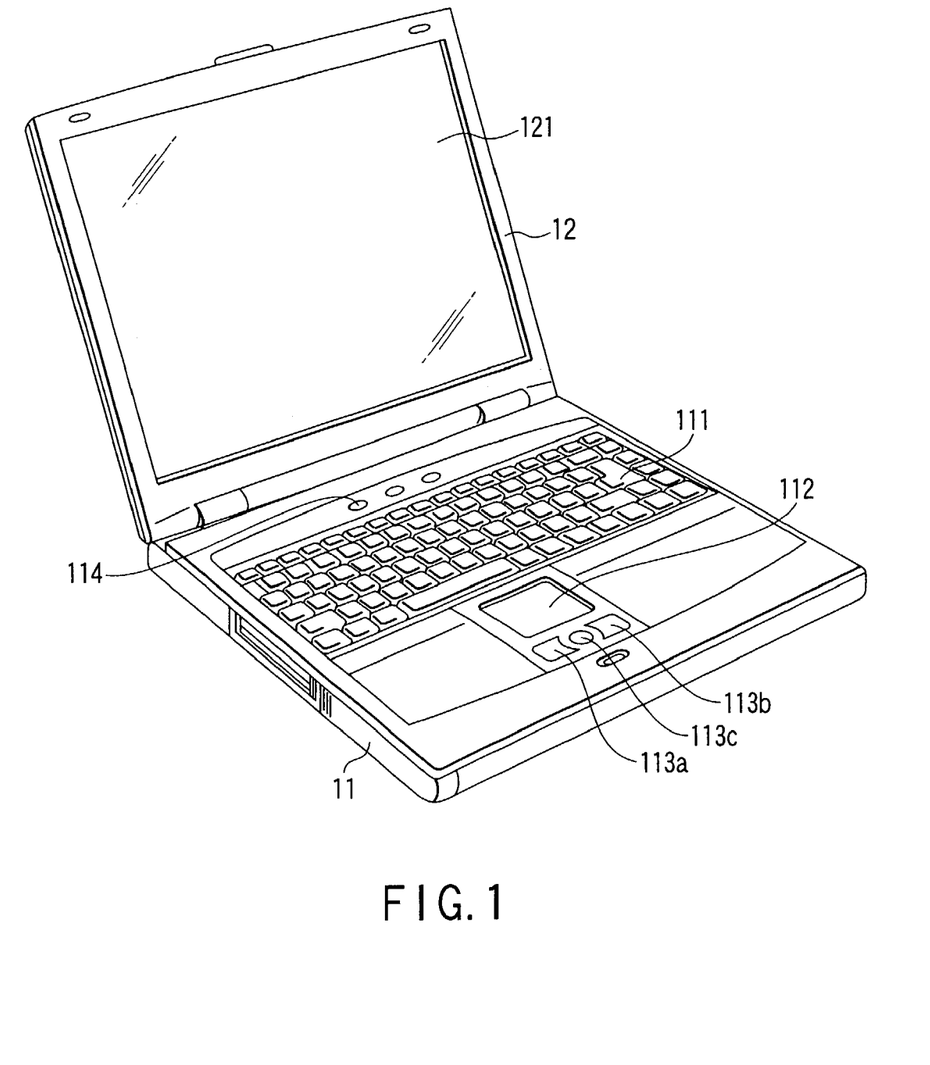
FIG. 1 is a diagram showing an appearance of a information processing apparatus according to an embodiment of the present invention.

FIG. 1 is a diagram showing an appearance of an information processing apparatus in the present embodiment. Here, an example of a notebook-size personal computer will be described.

As shown in FIG. 1, the computer according to the present embodiment is constituted of a computer main body 11 and display unit 12. In the display unit 12, a display screen (main display) 121 including an LCD is incorporated.

The display unit 12 is attached to the computer main body 11 so that the unit can rotate between a released position and closed position. The computer main body 11 includes a thin box-shaped housing, a keyboard 111 is disposed in a housing upper surface, and the upper surface of a housing portion in front of the keyboard 111 forms an arm rest. Substantially in a middle portion of the arm rest, a cPad™ device 112 which is used as the pointing device of the display united type as described above according to the present invention is disposed together with a left button 113a, right button 113b, and middle button 113c included in the cPad™ device. Furthermore, in the upper surface of the computer main body 11, a power button 114 is disposed to turn on/off a power supply of the computer main body 11.

Figure 2:
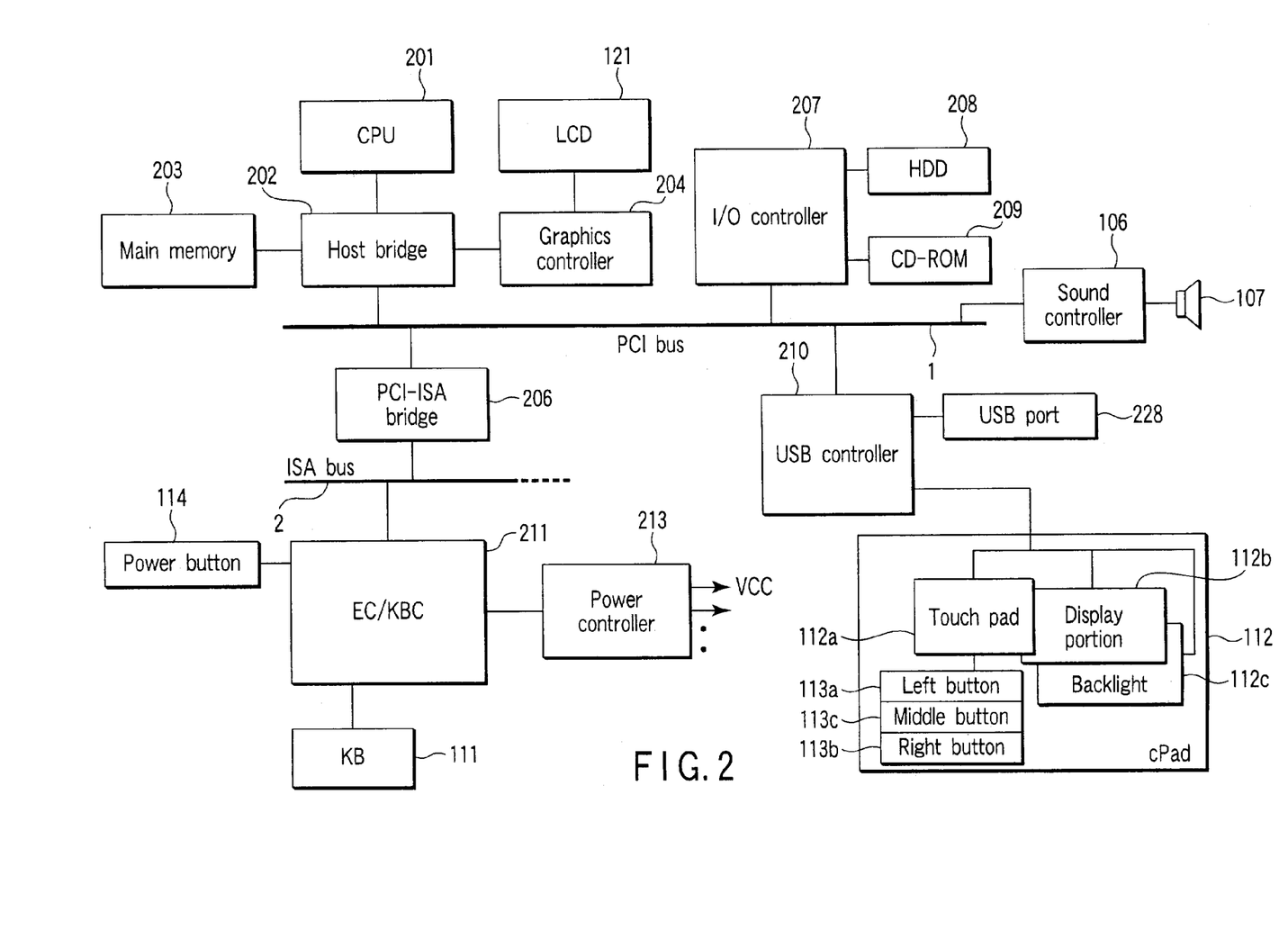
FIG. 2 is a block diagram showing a constitution of the information processing apparatus, according to embodiments of the present invention.

FIG. 2 is a block diagram showing a constitution of the computer system of the present embodiment.

As shown, this computer includes a CPU 201, host bridge 202, main memory 203, graphics controller 204, PCI-ISA bridge 206, I/O controller 207, hard disk drive (HDD) 208, CD-ROM drive 209, USB controller 210, embedded controller/keyboard controller IC (EC/KBC) 211, and power supply controller 213.

A PCI bus 1 connected between the host bridge 202 and PCI-ISA bridge 206 is connected to various controllers such as the I/O controller 207, USB controller 210, and sound controller 106.

The cPad™ device 112 and a USB port 228 are connected to the USB controller 210. The cPad™ device 112 includes a touch pad 112a, display portion 112b, and backlight 112c which are united, and also includes the left button 113a, right button 113b, and middle button 113c. The sound controller 106 is connected to a sound output portion 107 such as a speaker and beeper.

The CPU 201 is disposed to control the operation of the present computer, and executes an operating system and application program/utility program loaded in the main memory 203 from the hard disk drive (HDD) 208.

Figure 9:
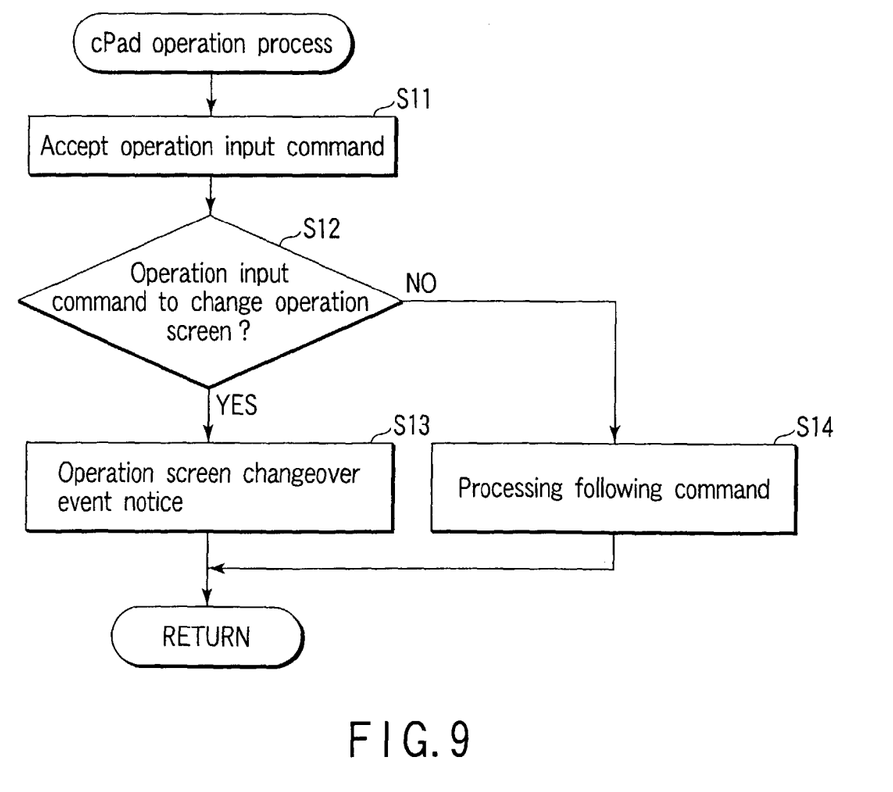
FIGS. 9 to 12 are flowcharts showing a procedure of an operation process, according to embodiments of the present invention.
Figure 10:
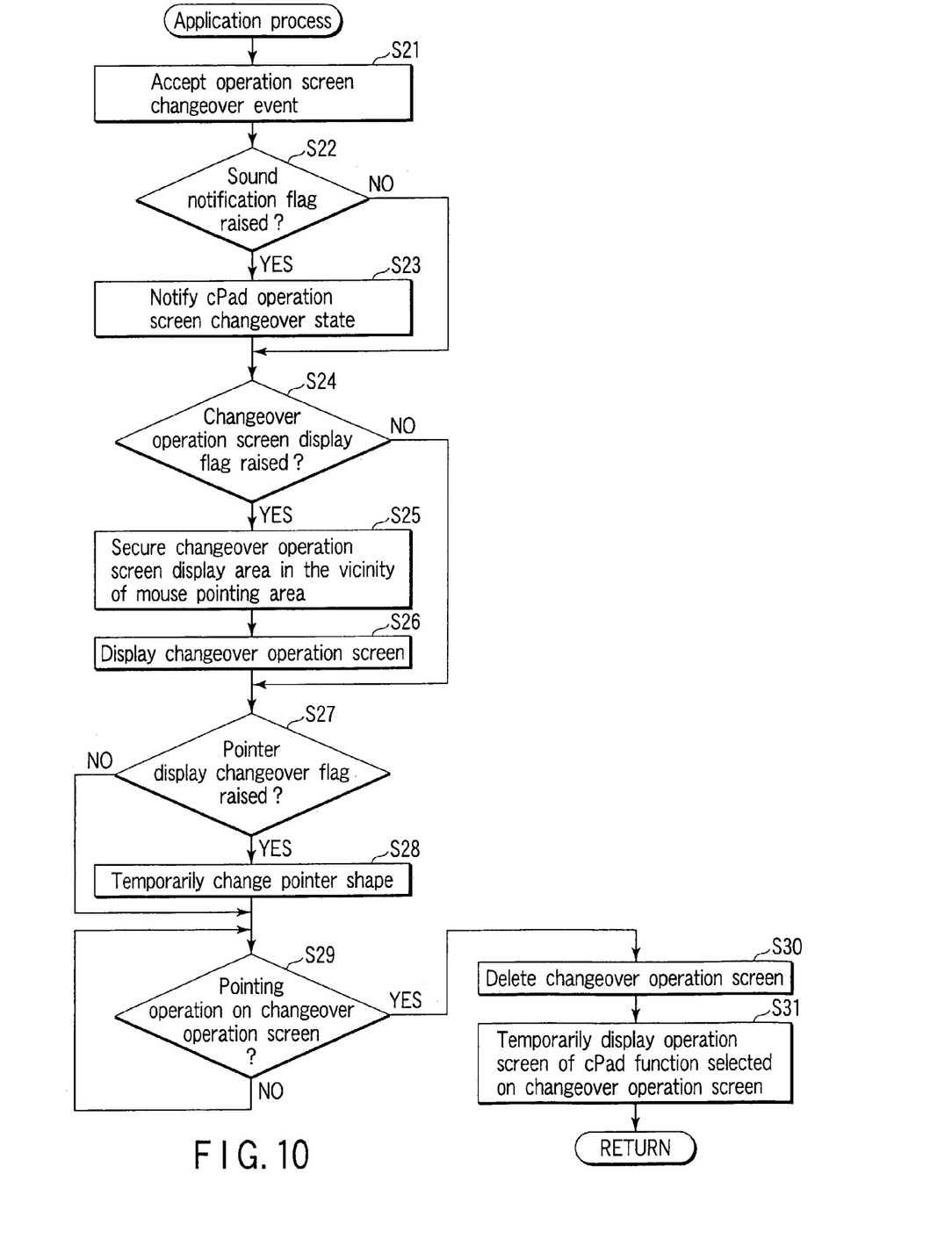

In the present embodiment, the application program related to the operation of the cPad™ device 112 is executed as shown in FIGS. 9 and 10. An execution process of the application program will be described later.

The host bridge 202 is a bridge device for bi-directionally connecting a local bus of the CPU 201 to the PCI bus 1. The graphics controller 204 controls the main display 121 which is used as a display monitor of the present computer. Moreover, when an external display is connected to a connection port for the external display, the graphics controller 204 controls the external display.

The I/O controller 207 controls the hard disk drive (HDD) 208, and CD-ROM drive 209. The PCI-ISA bridge 206 is a bridge device for bi-directionally connecting the PCI bus 1 to an ISA bus 2, and includes various system devices such as a system timer, DMA controller, and interrupt controller.

The embedded controller/keyboard controller IC (EC/KBC) 211 is a one-chip microcomputer in which an embedded controller (EC) for managing power and a keyboard controller (KBC) for controlling the keyboard 111 are integrated. This embedded controller/keyboard controller IC (EC/KBC) 211 has a function of cooperating with the power supply controller 213 to turn on/off power in response to the user's operation of the power button 114.

Figure 3:
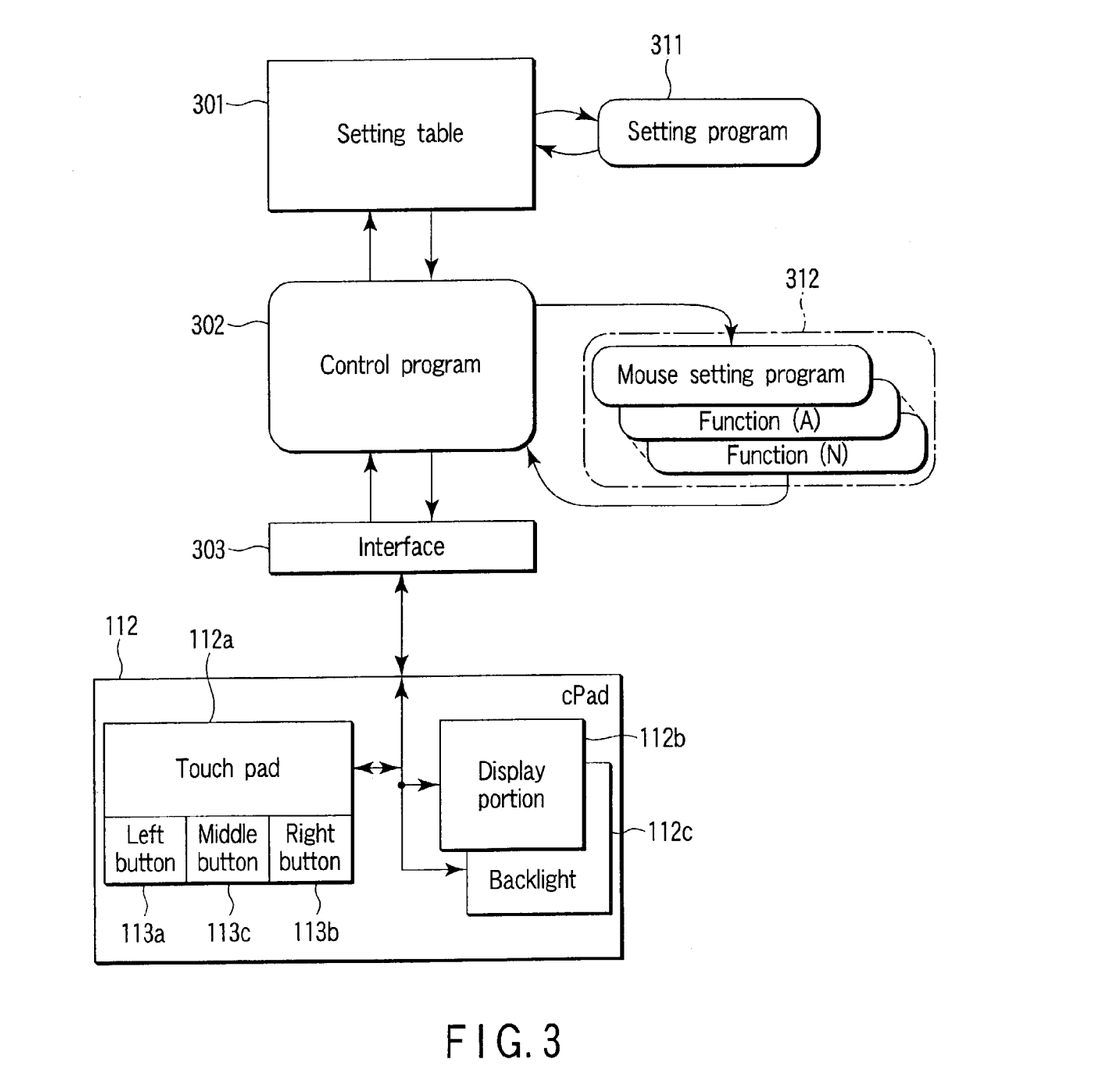
FIG. 3 is a block diagram showing a main part of the system, according to embodiments of the present invention.

FIG. 3 is a block diagram showing the main part of the system in the present embodiment. Here, constituting elements include: a setting table 301 for setting the function of the cPad™ device 112; a control program 302 for controlling the function of the cPad™ device 112 in accordance with the content of the setting table 301; an interface 303 for controlling input/output of information exchanged between the cPad™ device 112 and control program 302; a setting program 311 for preparing the setting table 301 by GUI; execution means 312 for executing various processes in accordance with the instruction of the control program 302; and the cPad™ device 112.

Figure 4:
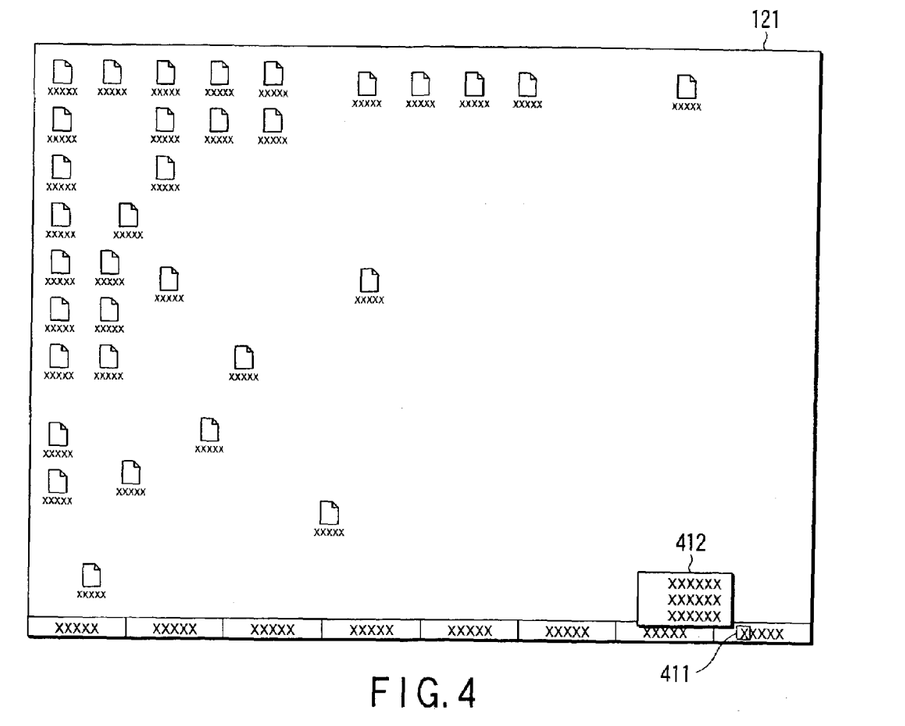
FIG. 4 is an explanatory view of an operation method on a main, according to embodiments of the present invention.

FIG. 4 is a diagram showing one example of display on the main display 121. There are displayed a tray icon (cPad™ property icon) 411 concerning the operation of the cPad™ device 112, and a pull-down menu 412 opened when the cPad™ property icon 411 is clicked/operated.

Figure 5:
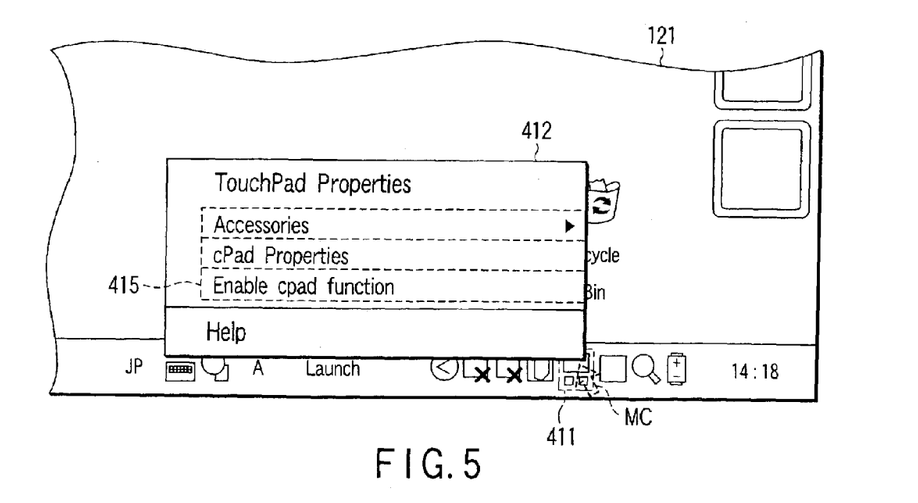
FIG. 5 is an enlarged view of a part of a screen of the main display, according to embodiments of the present invention.

FIG. 5 is a diagram showing the display of FIG. 4 in an enlarged size. That is, there are also displayed the cPad™ property icon 411 on the main display 121, and the pull-down menu 412 opened when the cPad™ property icon 411 is selected/clicked/operated with a mouse pointer (MC).

Figure 6:
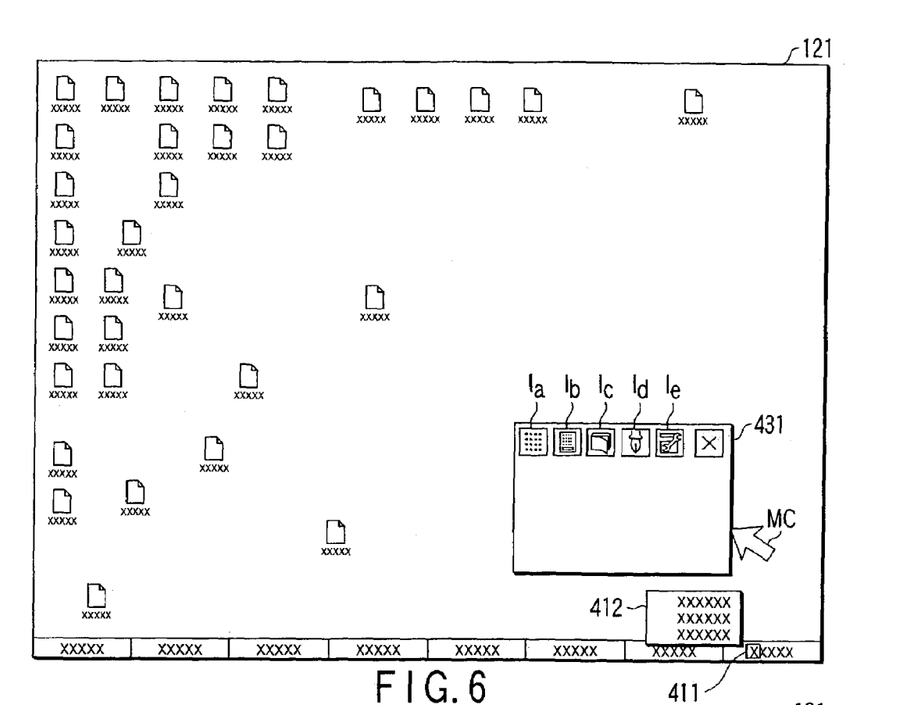
FIG. 6 is a diagram showing one example of a changeover menu screen displayed on the main display, according to embodiments of the present invention.
Figure 7:
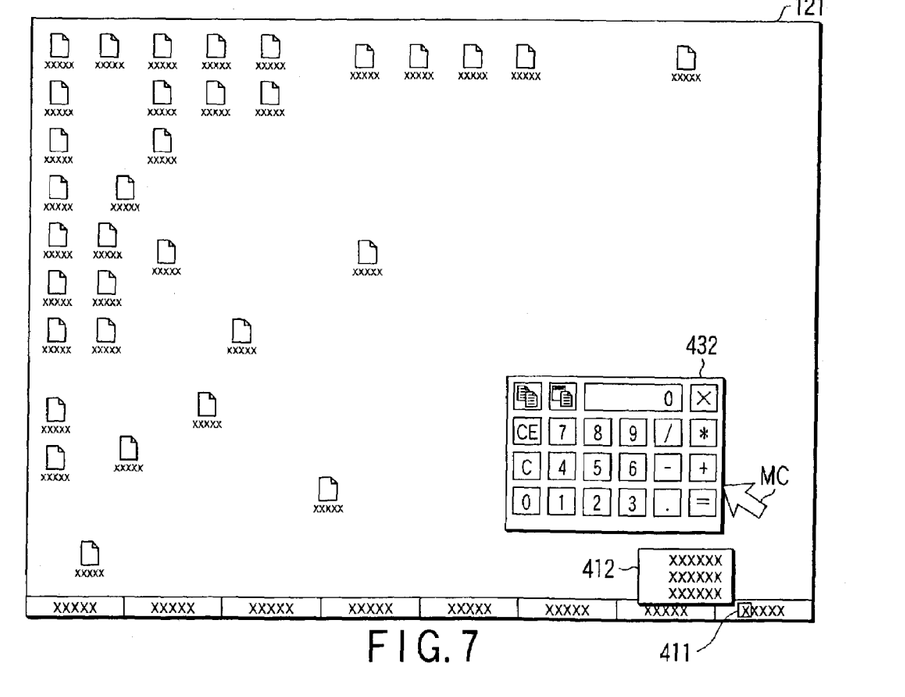
FIG. 7 is a diagram showing one example of an operation screen displayed on the main display, according to embodiments of the present invention.

In the pull-down menu 412, enable cPad™ function items 415 are disposed to provide various functions such as, but not limited to, functions for setting a changeover operation screen and for setting the display and operation of the operation screen operated by the cPad™ device 112 to be valid/invalid. Using the enable cPad™ function items 415, it is possible to display and operate a changeover operation screen (changeover menu screen) 431 operated by the cPad™ device 112 in the main display 121, as shown in FIG. 6. It is also possible to display and operate an operation screen 432 changed (selected) in the changeover menu screen 431 in the main display 121, for example as shown in FIG. 7. Moreover, this function can be set to be invalid.

FIG. 6 is a diagram showing an exemplary changeover menu screen 431 displayed on the main display 121 and operated by the cPad™ device 112.

In the present embodiment, the changeover menu screen 431 to be operated by the cPad™ device 112 is displayed in the vicinity of a pointing region being operated on the main display 121. In the changeover menu screen 431, selection buttons (icons) Ia, Ib, . . . of various operation screens to be operated by the cPad™ device 112, such as, but not limited to, numeric keys, calculator, memo, image drawing, and property are disposed.

FIG. 7 is a diagram showing one example of an operation screen 432 displayed on the main display 121 and operated by the cPad™ device 112. For example, when the selection button Ib of the calculator is clicked on the changeover menu screen 431 shown in FIG. 6, an operation screen of a calculator is displayed, as shown in FIG. 7, and calculation is possible using the calculator on the operation screen.

Figure 8:
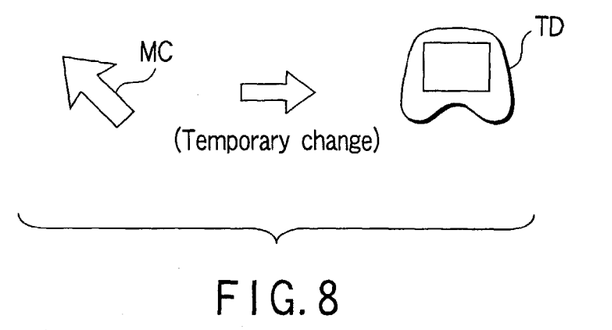
FIG. 8 are diagrams showing a temporary shape change of a mouse pointer displayed on the main display, according to embodiments of the present invention.

FIG. 8 shows a temporary shape change of the mouse pointer displayed on the main display 121. That is, the shape temporarily changes at the display start and changeover times of the screen operated by the cPad™ device 112.

In the present embodiment, when the display of the screen (changeover menu screen 431, operation screen 432) operated by the cPad™ device 112 is opened (started) or changed, the mouse pointer on the main display 121 temporarily changes from the mouse pointer (MC) having a first shape, for example, the shape shown on the left side of FIG. 8 to a mouse pointer (TD) having the second shape, for example, the shown on the right side of FIG. 8. Thereby, the user is notified of the start and changeover of the display of the screen operated by the cPad™ device 112. For the purpose of notification, in the present embodiment, the shape of the mouse pointer is changed. However, the user may also be notified, for example, by changing the color of the mouse pointer, by a flashing display or by any other suitable visual method. In addition, the user may be notified tactilely by, for example, a vibration of some portion of the information processing apparatus. In the present embodiment, when any operation screen is not selected on the changeover menu screen 431, the cPad™ device 112 is used as a pointing device equal to the mouse. Therefore, although the pointer on the main display 121 operated with the cPad™ device 112 may be referred to as a mouse pointer, operating as a mouse pointer is only one function of the pointer.

Figure 11:
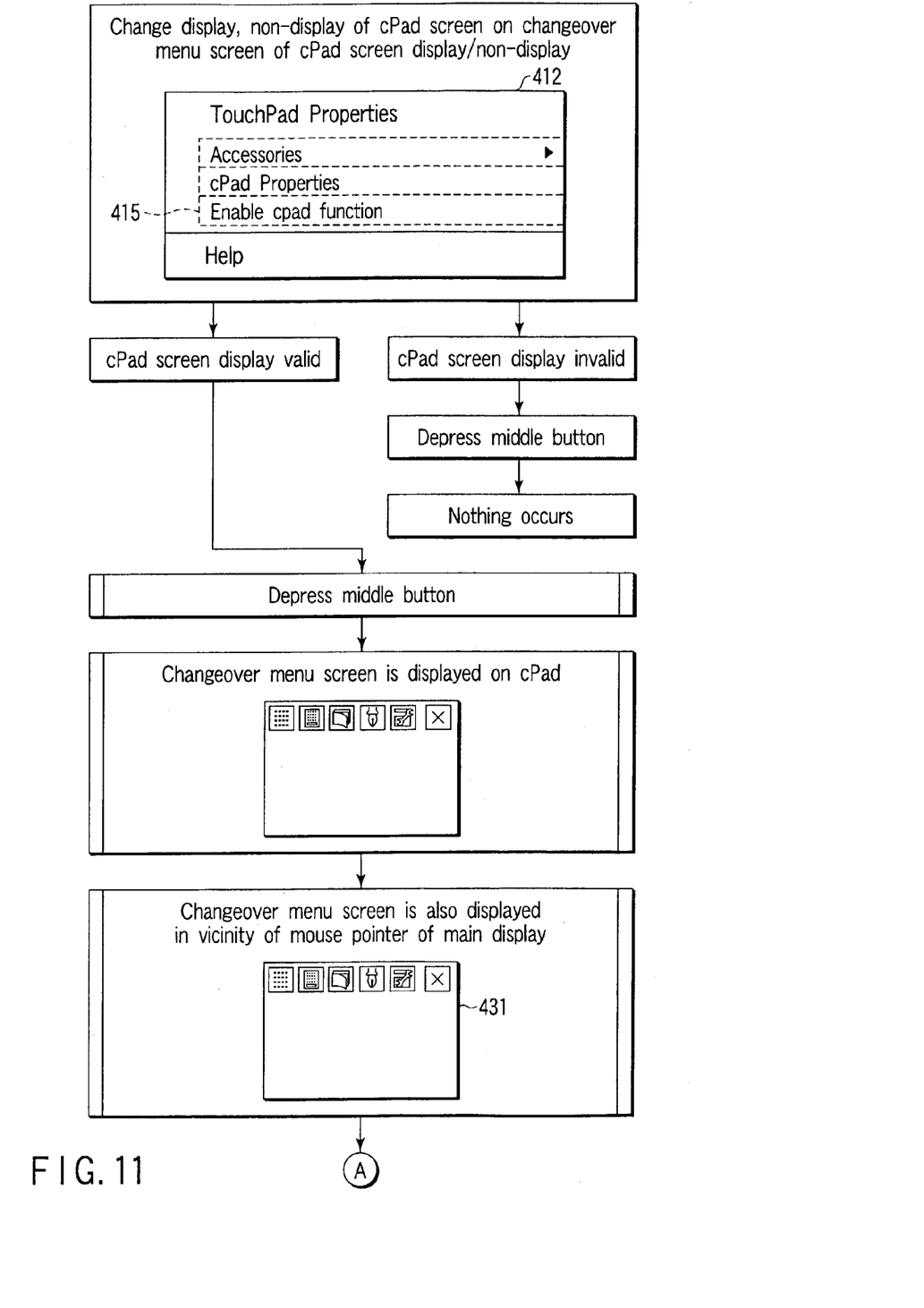
Figure 12:
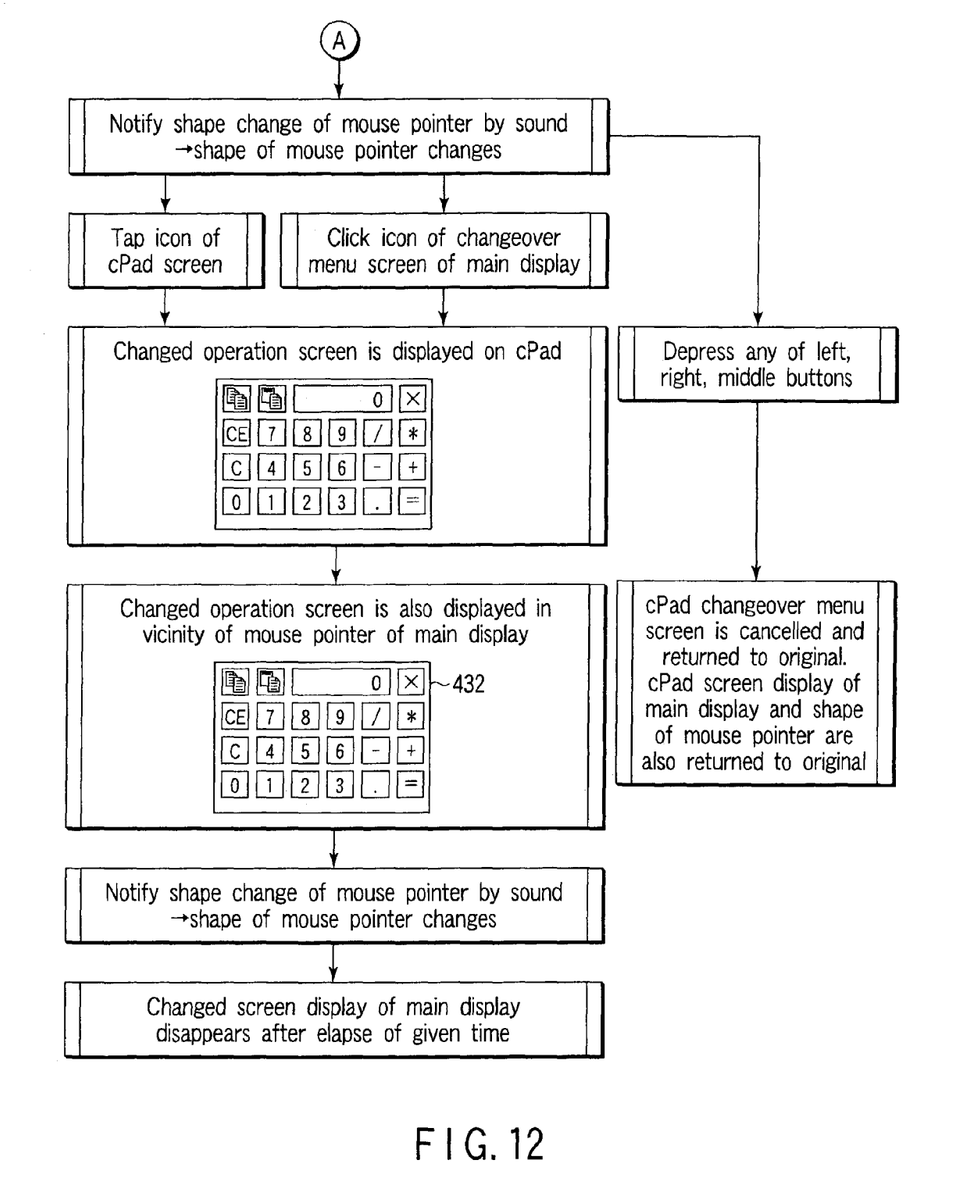

FIGS. 9 to 12 are flowcharts showing a procedure of an operation process of the present embodiment. FIG. 9 is a flowchart showing the procedure of the operation input process of the cPad™ device 112, which is executed by the control program 302 to control the cPad™ device 112. FIG. 10 is a flowchart showing the procedure of the operation process of the cPad™ device 112, which is executed by the main CPU 201. FIGS. 11 and 12 are flowcharts showing the procedure of the operation process in cPad™ screen processing.

An operation in the present embodiment will be described hereinafter with reference to FIGS. 9 to 12.

Immediately after starting the system, an operation input mode is obtained in which the cPad™ device 112 reflects the pointing operation of the cPad™ device 112 in the mouse pointer displayed on the main display 121. In this case, the cPad™ device 112 functions as a usual mouse pointing operation screen.

In this state, for example, the middle button 113c disposed in the cPad™ device 112 is operated, and a selection operation (operation for changing the operation screen) of another function mode of the cPad™ device 112 is performed. Then, the changeover menu screen is displayed in the display portion 112b of the cPad™ device 112 in the same manner as for the changeover menu screen 431 shown in FIG. 6. For example, when the selection button Ib of the calculator is clicked on the changeover menu screen 431, the operation screen of the calculator is displayed in the same manner as in the operation screen 432 shown in FIG. 7, and the calculation using the calculator is possible on the operation screen.

In this case, an operation input command following the operation on the cPad™ device 112 is accepted on the control program 302 of the cPad™ device 112 (step S11). At every acceptance, it is judged whether or not the operation input command is an operation input command for changing the operation screen (step S12). When the operation input command is not the command for changing the operation screen, the processing is executed in accordance with the command (step S14). On the other hand, with the operation input command to change the operation screen, an event indicating that the operation screen be changed is issued (step S13). This event is notified to the main CPU 201 via the USB controller 210. Therefore, when the main display 121 is visually checked and touch operation is performed, and even when the operation for changing the cPad™ operation screen is performed by mistake on the cPad™ device 112, the above-described event is notified to the main CPU 201.

On the other hand, when the cPad™ property icon 411 included in the tray icons is clicked/operated with the mouse pointer (MC) on the main display 121 as shown in FIGS. 4 and 5, the pull-down menu 412 is displayed. When the enable cPad™ function items 415 is operated on the pull-down menu 412, it is possible to operate the screens (the changeover menu screen 431, operation screen 432) to be operated by the cPad™ device 112 on the main display 121.

In this case, a changeover operation screen display flag is set which is managed by the main CPU 201 and which is included in a cPad™ device management flag. Furthermore, items such as, but not limited to, "perform/not perform sound notification" and "change/not change pointer display" are opened under the enable cPad™ function items 415. When settings are performed to "perform sound notification" or "change display of the pointer" on the items, a sound notification flag or a pointer display change flag included in the cPad™ device management flags are set. These cPad™ device management flags are not shown in the drawings.

The main CPU 201 accepts an event notice to change the screen of the cPad™ from the control program 302 of the cPad™ device 112 via the USB controller 210 (step S21). In response to this notice, it is judged by the setting of the enable cPad™ function items 415 whether or not the sound notification flag is raised (set) (step S22). When the sound notification flag is raised, the sound controller 106 is started, and it is notified that the screen of cPad™ is changed (step S23). This notification may be given through any of a beep sound and sound message. When the notification by sound is unnecessary (obtrusive), the sound notification flag is set to "not perform sound notification", and the notification by the sound may be invalidated.

Next, it is judged whether or not a changeover operation screen display flag is raised (set) in the setting of the enable cPad™ function items 415 (step S24). When the changeover operation screen display flag is raised, a display area of the changeover menu screen 431 is secured in the vicinity of the mouse pointer (MC) displayed on the main display 121 (step S25). Furthermore, the changeover menu screen 431 to be operated by the cPad™ device 112 is displayed in the secured area (step S26).

Thereby, when visually checking the main display 121 and performing the touch operation, the operator can change the operation screen of the cPad™ device 112 without visually checking the cPad™ device 112, and can smoothly and efficiently execute the touch operation. Moreover, for example, when the operation screen is changed by mistake on the cPad™ device 112, the mistake can instantly be noticed, and destruction of the data by an erroneous cPad™ operation, input mistake, and/or wasted operations can securely be prevented.

Next, it is judged whether or not a pointer display change flag is raised (set) in the setting of the enable cPad™ function items 415 (step S27). When the pointer display change flag is raised, the mouse pointer (MC) is changed to a pointer (TD) having, for example, the shape shown on the right side in FIG. 8 for a predetermined time, and the user is notified of the changeover of the cPad™ screen with the mouse pointer (step S28).

When visually checking the main display 121 and performing the touch operation, the operator visually checks in the vicinity of the mouse pointer (MC) in many cases. Therefore, it can be recognized with high probability that the cPad™ screen has been changed (for example, the operation screen has been changed by mistake on the cPad™ device 112).

Moreover, as shown in FIG. 6, when the changeover menu screen 431 to be operated by the cPad™ device 112 is displayed on the main display 121, the selection button of the operation screen to be operated (e.g., the selection button Ib of the calculator) is clicked in the selection buttons (icons) Ia, Ib, . . . of various operation screens on the changeover menu screen 431 (step S29). In response to this click, instead of the changeover menu screen 431, the operation screen 432 of the calculator is temporarily displayed as shown in FIG. 7 following the selection operation (steps S30, S31). Thereby, the operation screen 432 subjected to a changeover operation (selected) is confirmed, and the visual observation on the main display 121 and the touch operation can be continued. For example, when the operation screen is changed by mistake on the cPad™ device 112, the operation screen may be returned to the original, and the touch operation can be continued as such.

In this case, in addition to the confirmation of the operation screen 432 with the above-described changeover operation, the operation screen 432 is displayed continuously, not temporarily. After the operation ends on the operation screen. 432, the operation screen 432 can also be deleted from the main display 121. This function is realized, for example, by disposing selection item "operate/not operate operation screen 432 to be operated by cPad™ device 112 on main display 121" in the pull-down menu 412.

Alternatively, this function can also be realized by: displaying the operation screen 432 continuously, not temporarily; and deleting the operation screen 432 from the main display 121, when the operation ends on the operation screen 432 and there is a predetermined button operation (e.g., simultaneous operation of two buttons disposed in the cPad™ device 112).

A concrete operation procedure and state transition of the above-described cPad™ screen operation will be described with reference to FIGS. 11 and 12.

In this example, when the changeover operation screen display flag is raised (set) in the setting of the enable cPad™ function items 415 on the pull-down menu 412 described above, as shown in FIG. 11, the display of the cPad™ screen becomes valid on the main display 121. Moreover, as shown in FIG. 12, when the middle button 113c disposed in the cPad™ device 112 is depressed, the changeover menu screen displayed in the cPad™ device 112, and the same changeover menu screen 431 are displayed in the vicinity of the mouse pointer (MC) on the main display 121.

Moreover, when the changeover operation screen display flag is not raised (set), as shown in FIG. 11, the display of the cPad™ screen on the main display 121 becomes invalid. Even when the middle button 113c disposed in the cPad™ device 112 is depressed, there is no change in the display of the main display 121.

Moreover, when the changeover operation screen display flag is raised (set) in the setting of the enable cPad™ function items 415 on the above-described pull-down menu 412, that is, when the display of the cPad™ screen becomes valid on the main display 121 as shown in FIG. 11, the sound notification flag and pointer display change flag, for example, are raised (set). In this case, when the changeover menu screen 431 is displayed as shown in FIG. 12, a cPad™ screen change is notified to the user by a sound (beep sound or sound message) and mouse pointer shape (or color, display mode) change. Thereby, when visually checking the main display 121 and performing the touch operation, the user can securely recognize the change of the cPad™ screen (for example, the operation screen has been changed by mistake on the cPad™ device 112) without visually checking the cPad™ device 112.

Furthermore, in this case, when the changeover menu screen is tap-operated on the cPad™ device 112, the changed operation screen can be displayed in the cPad™ device 112. Moreover, when one of the selection buttons (icons) Ia, Ib, . . . is clicked in the changeover menu screen 431 on the main display 121, the changed operation screen 432 can be displayed in the cPad™ device 112.

In this case, when the cPad™ screen is changed, as shown in FIG. 12, the cPad™ screen change is notified to the user by the sound and the shape change of the mouse pointer. Subsequently, the operation screen 432 is displayed for the predetermined time for which the visual confirmation is possible, and subsequently deleted. Thereby, the operation screen 432 subjected to the changeover operation (selected) is confirmed, and the visual observation on the main display 121 and the touch operation can be continued. Moreover, when the operation screen is changed by mistake on the cPad™ device 112, the user may return the operation screen to the original, and the touch operation can be continued as such.

Moreover, as shown in FIG. 12, in a state in which the changeover menu screen 431 is displayed, a predetermined button is depressed among three buttons disposed in the cPad™ device 112. At this time, the changeover menu screen 431 displayed in the cPad™ device 112 and main display 121 is deleted, and the mouse pointer returns to its original shape.

As described above, it follows that according to the present embodiment a mechanism to confirm and change the cPad™ screen without visually checking the cPad™ device 112 is disposed, and thereby the erroneous operation can be prevented. Moreover, when the cPad™ screen is changed by the erroneous operation, the user may return the operation screen to the original without visually checking the cPad™ device 112. Moreover, the changeover of the cPad™ screen can be permitted/prohibited without visually checking the cPad™ device 112. In addition, the changeover of the cPad™ screen is displayed in the main display 121, and can further be notified by outputting a sound. Therefore, the stage after the changeover of the cPad™ screen can securely be confirmed without visually checking the cPad™ device 112. Moreover, without visually checking the cPad™ device 112, the state of the screen display of the cPad™ device 112 can always be confirmed by the touch operation while visually checking the main display 121. Therefore, the touch operation can smoothly and efficiently be executed.

It is to be noted that one example of each of the hardware and software constitutions of the computer, screen constitution, and operation procedure has been described in the above-described embodiment, and these are not specified in carrying out the present invention.

According to the present embodiment, there can be provided the computer system and operation method of the computer in which the erroneous operation is prevented in advance and touch operation can be smoothly performed in the constitution including two display devices to display the operation screen on each display device.

What is claimed is:

1. A computer system comprising:

a main display;

a pointing device in which a sub-display is integrally disposed;

operation input control means for reflecting a pointing operation of the pointing device in a pointer indicator displayed on the main display;

display control means for displaying on the main display a changeover operation screen when an operation for changing an operation screen displayed on the sub-display is performed using the pointing device; and setting means for setting the display control means to be valid or invalid, wherein the operation screen displayed on the sub-display is temporarily displayed on the main display following an operation of the changeover operation screen displayed on the main display in a state when the display control means is set to be valid by the setting means.

* * * * *